US 8,947,224 B2

(12) United States Patent
Jensen et al.

(10) Patent No.: US 8,947,224 B2
(45) Date of Patent: Feb. 3, 2015

(54) ENVIRONMENTAL DATA COLLECTION

(75) Inventors: Thomas P. Jensen, Boise, ID (US);
Kirk M. Gruell, Nampa, ID (US);
Casimir E. Lawler, Jr., Boise, ID (US)

(73) Assignee: PakSense, Inc., Boise, ID (US)

(*) Notice: Subject to any disclaimer, the term of this patent is extended or adjusted under 35 U.S.C. 154(b) by 1455 days.

(21) Appl. No.: 12/255,332

(22) Filed: Oct. 21, 2008

(65) Prior Publication Data

US 2009/0066505 A1 Mar. 12, 2009

Related U.S. Application Data

(63) Continuation-in-part of application No. 11/712,075, filed on Feb. 28, 2007, now Pat. No. 7,674,409.

(60) Provisional application No. 60/777,953, filed on Feb. 28, 2006.

(51) Int. Cl.
*G08B 1/00* (2006.01)
*G01K 1/02* (2006.01)
(Continued)

(52) U.S. Cl.
CPC *G01K 1/024* (2013.01); *G01K 3/04* (2013.01); *G06F 19/3418* (2013.01); *G01D 1/14* (2013.01); *G01K 1/022* (2013.01)
USPC ........... 340/531; 340/533; 340/540; 340/584; 340/585; 340/586; 340/588; 340/589

(58) Field of Classification Search
CPC ........... G01K 1/00; G01K 1/02; G01K 1/022; G01K 1/024; G01K 1/026; G01K 1/028; G01K 3/00; G01K 3/02; G01K 3/04; G01K 3/08; G01K 3/10; G06K 19/0716; G06K 19/0717; G06Q 10/08; G06Q 10/083; G06Q 10/0832; G06Q 10/0833; G06Q 10/0835; G06Q 10/0838

USPC .......... 340/539.22, 0.26–0.28, 540, 601, 602, 340/584–586, 588, 589, 669, 679, 683, 340/686.1, 689, 521, 522, 531, 533–538.17, 340/539.1–539.32
See application file for complete search history.

(56) References Cited

U.S. PATENT DOCUMENTS 4,206,449 A * 6/1980 Galvin et al. ................. 340/505
5,442,669 A 8/1995 Medin
(Continued)

FOREIGN PATENT DOCUMENTS

DE 200 13 622 U1 12/2000
EP 1319928 A1 6/2003
GB 2 361 064 A 10/2001

OTHER PUBLICATIONS

International Search Report and Written Opinion from related PCT Application PCT/US 2009/005728, Jun. 7, 2010 (11 pgs).
(Continued)

*Primary Examiner* — Steven Lim
*Assistant Examiner* — Ryan Sherwin
(74) *Attorney, Agent, or Firm* — Brooks, Cameron & Huebsch PLLC

(57) ABSTRACT

One computer readable medium embodiment includes computer readable instructions stored thereon for execution by a device to perform a method of environmental data collection. The method can include receiving environmental data and associated time data. The method can also include aggregating time data into categories of environmental data within, above, and below a range. The method can further include outputting the aggregated and categorized time data.

21 Claims, 13 Drawing Sheets

(51) Int. Cl.
*G01K 3/04* (2006.01)
*G06F 19/00* (2011.01)
*G01D 1/14* (2006.01)

(56) References Cited

U.S. PATENT DOCUMENTS

| | | | |
|---|---|---|---|
| 5,506,574 A * | 4/1996 | Chiarello | 340/691.4 |
| 5,691,742 A * | 11/1997 | O'Connor et al. | 715/835 |
| 5,802,015 A | 9/1998 | Rothschild et al. | |
| 5,835,553 A | 11/1998 | Suzuki | |
| RE36,200 E | 4/1999 | Berrian et al. | |
| 6,157,306 A * | 12/2000 | Mularoni | 340/602 |
| 6,163,281 A * | 12/2000 | Torch | 341/21 |
| 6,252,505 B1 * | 6/2001 | Bade | 340/540 |
| 6,337,836 B1 | 1/2002 | Eidelson | |
| 6,366,211 B1 * | 4/2002 | Parker | 340/693.2 |
| 6,614,235 B2 * | 9/2003 | Kraz | 324/457 |
| 6,794,992 B1 * | 9/2004 | Rogers | 341/176 |
| 6,795,376 B2 | 9/2004 | Quine | |
| 6,950,028 B2 | 9/2005 | Zweig | |
| 7,057,495 B2 | 6/2006 | Debord et al. | |
| 7,079,023 B2 * | 7/2006 | Haller | 340/522 |
| 7,102,526 B2 | 9/2006 | Zweig | |
| 7,142,110 B2 * | 11/2006 | Schmidtberg et al. | 340/539.27 |
| 7,173,539 B2 * | 2/2007 | Schultz | 340/603 |
| 7,880,641 B2 * | 2/2011 | Parris et al. | 340/870.02 |
| 8,401,588 B2 * | 3/2013 | Hameed et al. | 455/552.1 |
| 2004/0212508 A1 | 10/2004 | Zweig | |
| 2005/0151656 A1 | 7/2005 | Yuen | |
| 2005/0248455 A1 | 11/2005 | Pope et al. | |
| 2007/0008119 A1 * | 1/2007 | Pohle et al. | 340/539.22 |
| 2007/0085678 A1 * | 4/2007 | Joy et al. | 340/539.26 |
| 2007/0203650 A1 | 8/2007 | Jensen et al. | |
| 2007/0241261 A1 | 10/2007 | Wendt | |

OTHER PUBLICATIONS

Office Action from related Canadian patent application No. 2,741,410, dated Aug. 15, 2013, 8 pp.
Supplementary Search Report from related European patent application No. EP 09822317, dated Jul. 30, 2013, 7 pp.
Second Office Action Action from related Canadian Application No. 2,741,410, Jun. 27, 2014 (8 pages).

* cited by examiner

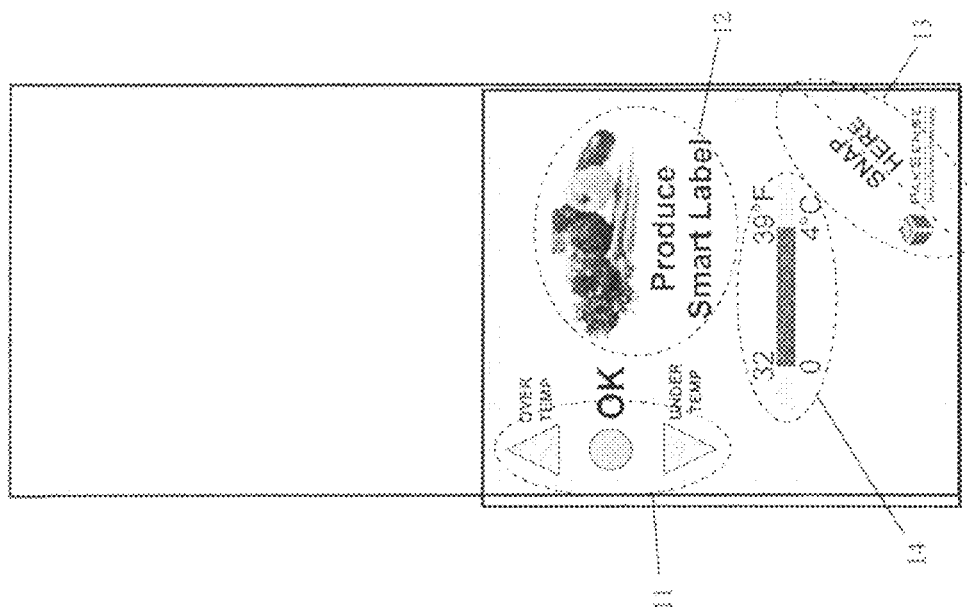

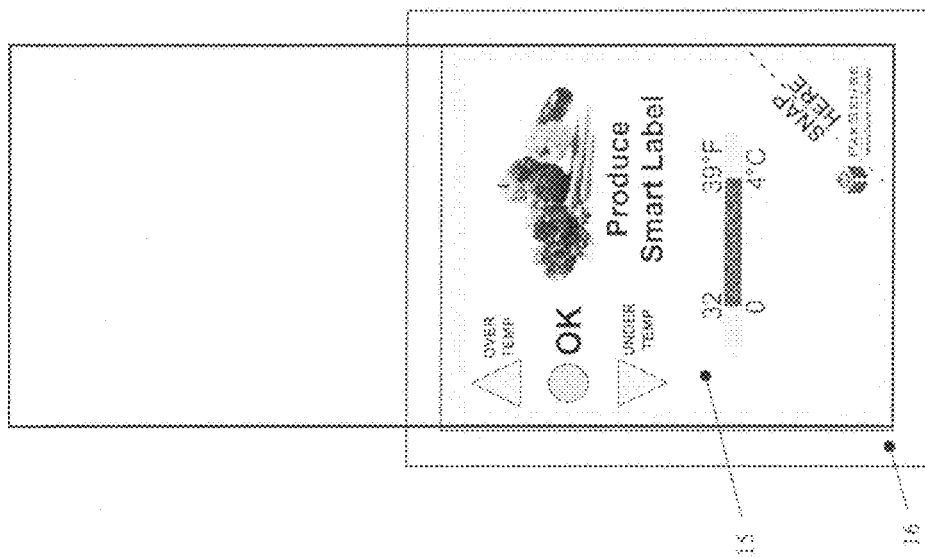

ENVIRONMENTAL DATA COLLECTION

PRIORITY INFORMATION

This application is a Continuation-in-Part of U.S. patent application Ser. No. 11/712,075 filed Feb. 28, 2007, which claims priority to U.S. provisional application 60/777,953 filed Feb. 28, 2006, the full disclosures of which are incorporated herein by reference.

BACKGROUND

Embodiments of the present disclosure relate generally to sensing environmental conditions, converting and processing sensed data, as well as storing derived information and conveying derived information in order to inform users as to conditions that exist. Aspects of the present disclosure also relate to methods for constructing, applying, using, and evaluating such data.

SUMMARY

Producers, distributors, warehousers, and quality personnel, among others, especially those in charge of perishable, spoilable, or high-value items that are, for example, moving through a logistics supply chain, typically have to know the condition of items for which their operation is accountable. Also, the customer perception of quality may be of value in some industries and, therefore, the monitoring of products through the supply chain may be used to indicate such quality to a customer base.

Further, some entities may be interested in lowering insurance premium costs and the monitoring of products through the supply chain may be one way to reduce such costs. Monitoring the environment of products as they travel is a way of gaining such efficiencies, increasing traceability, and/or of providing for the quality and safety of products which can influence one or more of the above factors, among other benefits.

Embodiments of the present disclosure can be utilized to provide a simple to use, low-cost, accurate, disposable, and/or re-usable devices as an element of a monitoring system. Environmental sensing device embodiments, for example, can be a tag, label, or an assembly that is built into a package.

In such embodiments, the device can include a circuit assembly (e.g., printed circuitry) containing a sensor or sensors, a power source, and/or other electronic circuitry. Embodiments of the present disclosure can include rigid and/or or flexible circuit components.

In various embodiments, the environmental sensing device can be as small as about 1.5 inches square by about 0.1 inches high, which can, for example, be fit into larger materials. Some embodiments utilize a transparent, semi-transparent or opaque pouch that forms an outer layer over the circuit assembly. Such pouches can be designed to meet industry standards, such as food safety standards. In this way, if the pouch is sealed, the pouch may be approved for use (e.g., as safe for placement adjacent to food) while the contents do not have to be approved. This case saves significant time and money since the manufacturer does not have to gain approval of the apparatus to be placed within the pouch, in some instances, among other benefits.

In some embodiments, a portion of or all of an environmental sensing assembly and/or an electronics assembly can be manufactured from one or more materials that meet a food safety standard. As defined herein a food safety standard can be any standard created by an entity (e.g., the U.S. Food and Drug Administration) to regulate usage with food.

Various methods of manufacturing and using such monitoring devices are described in the present disclosure. Further, the present disclosure provides method embodiments for communicating with such devices and conveying their data in ways that fit the applications that the devices are intended to address.

Embodiments of the present disclosure can include computer readable media having computer readable instructions (e.g., software, firmware, etc.) stored thereon for execution by a device to perform methods of environmental sensing. Such software can be stored in an environmental sensing assembly, a remote reader device, or a computing device, among other devices. Some methods of environmental sensing are described in more detail herein.

One or more embodiments of the present disclosure can include a remote reader device for communicating environmentally sensed data. Such devices can communicate with one or more electronics assemblies described herein, among communicating with other devices such as computing devices.

A remote reader device can be beneficial, for example, in facilitating an early indication of an environmental status of goods received from a supply chain. For example, a remote reader device can be used by shipping technicians responsible for receiving shipments of perishable products before more detailed environmental information is passed on to specialists for a more in-depth analysis.

These and other embodiments of the present disclosure will be discussed more fully in the detailed description. The features, functions, and/or advantages can be achieved independently in various embodiments of the present disclosure, or may be combined in yet other embodiments.

BRIEF DESCRIPTION OF THE DRAWINGS

FIG. 2 is a top view of a labeled circuit assembly of an embodiment of the present disclosure, providing detail of graphical features.

FIG. 3 is a top view of a pouched monitoring device of an embodiment of the present disclosure.

DETAILED DESCRIPTION

Figure 1A:
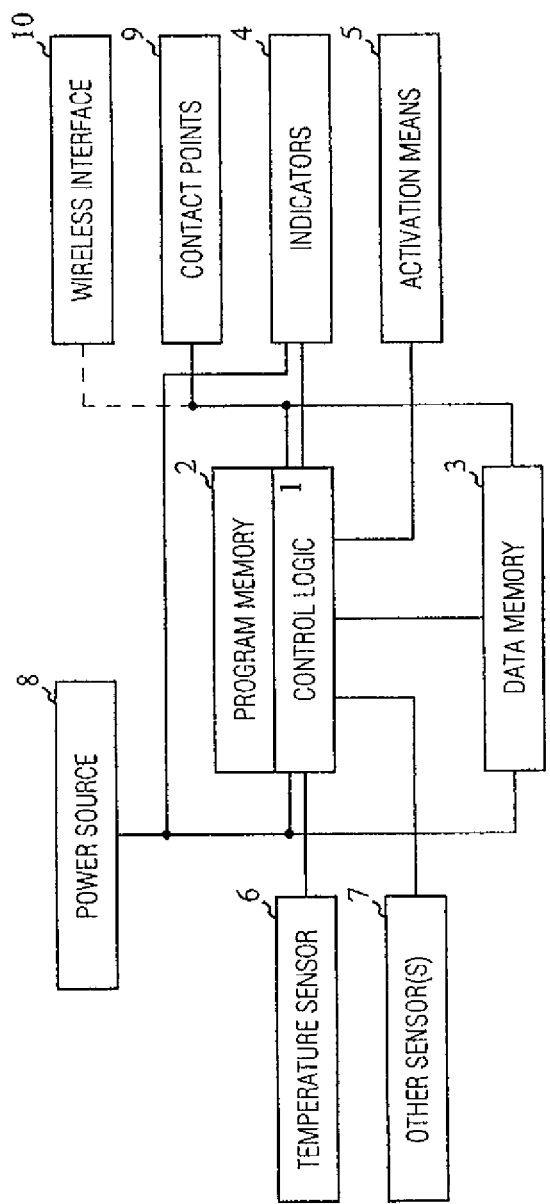
FIG. 1A is a schematic block diagram of a circuit of an embodiment of the present disclosure.

The present disclosure describes a number of device, system, and method embodiments. For example, in some device embodiments, the device includes an electronic circuit and associated executable instructions (e.g., software, firmware, etc.), enclosed in a label, tag, or package, that monitors environmental conditions.

One or more embodiments may include a logic circuit such as a controller, a microprocessor, a micro-controller, an application specific integrated circuit (ASIC), or the like. The logic circuit may be interfaced with a memory configured to provide storage of a set of computer readable instructions in the form of software, firmware, and/or hardware that provides functionality. Thus, the functionality described with respect to various software-based embodiments is also applicable to hardware-based embodiments, and conversely.

The interfaced memory may be implemented as one of, or a combination of volatile and non-volatile memory, such as dynamic random access memory ("RAM"), EEPROM, Flash memory, or the like. It is also within the purview of the present disclosure that the memory may be included in the logic circuit.

The various embodiments of the present disclosure can include a number of different features and functionalities. For example, some environmental sensing device embodiments can be read through use of a remote reader device that penetrates an outer coating of the device to touch a number of contacts therein.

In some embodiments, the contacts are located on the outside of the environmental sensing device and therefore the reader does not penetrate the device. In various embodiments, the reader can be wireless and can receive information from the device without contacting the device.

Some wireless embodiments of the device and reader, can be usable at a short range and/or at long range. For example, some such embodiments can utilize portable device communication formats (e.g., GSM, ANSI, etc.) to communicate information to and/or from the device. Wireless embodiments can include the use of radio frequency identification (RFID).

The present disclosure also includes embodiments that can be activated by a variety of different mechanisms. For example, some environmental sensing assembly embodiments can be activated by snapping, breaking, or bending a portion of the device, among other mechanisms. Similarly, some embodiments can be activated by one or more radio frequency (RF) signals.

In some embodiments, a display can also be provided in various forms. For example, a number of LED's can be used, in some embodiments. Embodiments can include displays that are liquid crystal displays (LCD), and in some embodiments, the display can include touchscreen functionality.

Various embodiments can utilize a chemical change to provide a portion of or the entire display functionality. For example, an electrochemical component can be used to provide at least some display functionality, in some embodiments.

Some embodiments can have different physical characteristics. For example, various environmental sensing device embodiments can be designed to be folded, laminated, or pouched, and/or reusable or disposable. Remote reader device assemblies can, in some embodiments, be housed in a molded plastic handheld clamshell.

Embodiments can include memory to store various data that is accumulated by a device, such as time and environmental condition data. In some embodiments, this information can be provided to a database that is not contained within the device (e.g., a database on a server with a web portal for access by a number of clients). In one or more embodiments, information can be provided to the database via wireless communication, a universal serial bus (USB) interface, or other communication methods.

Embodiments can also be designed to take time and temperature measurements rather than merely tallying a number of times that a sensor has exceeded a threshold or the amount of the time the sensor was over the threshold. This can be important in some instances, particularly in instances where not only the amount of time over the threshold is important, but where the amount that the environmental condition was over the threshold is also important (e.g., in food safety situations where the higher the temperature to which a product is exposed, the more quickly it will perish).

The present disclosure also includes embodiments that incorporate memory compression techniques that allow a device to store more information. For example, a device embodiment can include a variation limit data compression mechanism that can discard data points if there is no change, or if the change is not outside a variation limit.

Data points can be averaged, in some embodiments, if the data points are within a particular range that is deemed acceptable (e.g., although data may be taken every minute, some data points can be averaged and that point can be stored, since all data averaged is within an acceptable range). In some embodiments, such variation limits, thresholds, and/or averaging parameters can be set and/or adjusted by the user, seller, or manufacturer based, for example, upon the type of product with which the device is to be used.

In some embodiments, executable instructions can be provided that are executable by a logic circuit to take an environmental measurement at a predetermined time interval. In various embodiments executable instructions can be provided that are executable by the logic circuit to take an average of a number of such environmental measurements. These averages can, for example, be calculated through use of a number of sets of environmental measurements.

As discussed above, executable instructions can be provided, in some embodiments, that are executable by the logic circuit to store an environmental measurement if it is within a predetermined range of values and/or within a predetermined range of value variations. For example, if a temperature is between 40 and 70 degrees F. (in such embodiments, a range can be one threshold, such as 40 degrees, and no second limit, thereby making the range, for example, 40 degrees and above), the temperature can be recorded.

In one or more embodiments, computer readable instructions can be stored on a computer readable medium for execution by a device to receive environmental data and associated time data, aggregate time data into categories of environmental data within, above, and/or below a range, and output the aggregated and categorized time data. For example, the data can be output to a display on a remote reader device. In some embodiments, the time data can be output as percentages of a total time over which environmental data is measured, or as hours and minutes for each category, among other methods.

In one or more embodiments, computer readable instructions can be stored on a computer readable medium for execution by a device to receive environmental data and associated time data, multiply an amount by which environmental data is out of a range by the associated time data to determine a product characterizing a relative magnitude of an alert event, and output the product. For example, the product can be output to a display on a remote reader device. Some embodiments can include summing a number of products, each corresponding to environmental data that is out of the range by different amounts during the alert event, and outputting the sum.

An alert event can begin when environmental data is out of a particular range. For example, if a particular range of environmental data is 40 to 70 degrees F., an alert even could begin when a measured temperature falls below 40 degrees or rises above 70 degrees. That alert event would continue until the environmental data returns within the range (e.g., when the temperature returns to some point between 40 and 70 degrees F.).

With respect to embodiments that include temperature measurement as at least one type of environmental measurement, the product can be output in units of degree-minutes. That is, the product is the total number of degrees over a maximum or under a minimum threshold (e.g., ends of a range of environmental data) multiplied by the time at that temperature. For alert events including more than one data point outside of the range, the product can be output as a sum of a number of products during a sample time interval.

Outputting the product in such units (e.g., degree-minutes) can help characterize the relative magnitude of an alert event. For example, an out of range (e.g., over-temperature) of 30 degrees for one minute might result in a product of 30 degree-minutes, which would have the same relative magnitude as an out of range (e.g., over-temperature) of 1 degree for 30 minutes. In some embodiments, the quantification of an out of range event can be a preset quantity and/or a quantity that can be set, for example, based on the item being monitored, among other considerations. Accordingly, providing a display of such information can help provide an early indication of the potential impact of an alert event (e.g., to a shipping/receiving technician who is responsible for determining whether to accept a particular shipment of environmentally sensitive goods).

In some instances, a remote reader device may receive environmental data from more than one environmental sensing assembly. In such instances, the remote reader device may also receive an assembly identifier from each assembly, and output the identifier along with the calculated product to indicate which assembly is reporting an alert event. For example, alert events can be output to a display on the remote reader device on an assembly-by-assembly basis. Such embodiments can be beneficial for determining which alerts correspond to which shipments when a reader device is used in association with more than one shipment.

In one or more embodiments, an indication of whether the environmental data out of the range is above or below the range can be output along with the product. Such an indication can include, for example, an icon such as an up or down arrow to indicate if the data associated with the alert event is above or below the range. Such embodiments can be beneficial with respect to products that have different sensitivities to environmental conditions above or below a particular range. For example, some perishable products may be more sensitive to temperatures above a particular range than to temperatures below the range.

In some embodiments, the aggregated time data can be output to a display. The aggregated time data can represent a duration of the alert event (e.g., an amount of time during which the measured environmental data was out of the range). Displaying such information can help define the alert event for a user of the remote reader device.

Embodiments can include executable instructions to output the environmental data out of the range to a display. For example, a temperature that is recorded out of the range can be output to the display. In some embodiments, data corresponding to a maximum amount by which environmental data is out of the range during the alert event can be output to the display.

This information can be useful, for example, for items that may have a critical environmental condition to which they cannot be exposed. For example, an item may have a preferred range of an environmental condition (e.g., 40 to 70 degrees F.) where the item may be less than ideal, but still acceptable, if it is exposed to conditions outside of the range.

The item may also have a critical threshold condition (e.g., 100 degrees F.) where the item would be unacceptable if exposed to conditions beyond that critical point. Accordingly, displaying a maximum or minimum environmental data point can allow a user to determine if an item has crossed a critical threshold.

Embodiments can include outputting a start time for environmental data out of the range. That is, the time that the measured environmental data first passes out of the range can be output to the display. Such information can be valuable to a user in determining where a particular shipment was when the environmental condition deviated from the range, which may be useful in helping to determine a cause of the deviation, among other uses.

With respect to value, as used herein, a value variation is a variation from a particular value. The value can be preset, based upon an average as described above, based upon a last stored value or a last measured value, among other values that can be utilized to measure a variation therefrom.

Embodiments of the present disclosure can be fabricated from a variety of materials. For example, device embodiments can be fabricated with rigid or flexible circuit components and in some embodiments, these components can be printed circuit components. These and other features and functionalities of the various embodiments of the present disclosure are discussed in more detail below.

In some environmental sensing embodiments, the embodiment can have the ability for the label, tag, or package to convey its information to users in one of a variety of ways. For example, as shown in the embodiment of FIG. 1A, a circuit of the label, tag, or package may include a controller, such as a microcontroller and/or other logic circuitry (e.g., state machine, hard wired logic, etc.) 1, a program memory 2 (e.g., read-only, read-writable), a data memory 3, a display and/or indicators 4, an activation mechanism 5, a one or more environmental sensors 6 (e.g., temperature sensor), one or more optional other sensors 7, such as humidity, physical orientation, proximity, acceleration, atmospheric pressure, shock, tilt, vibration, pressure, light, chemical, or others, and/or a power source 8.

Activation mechanism 5 can be provided by a number of possible circuits and constructions, including ones that include a breakaway tab switch, a pull-tab switch, a momentary switch, a dome switch, an infrared switch, a magnetic switch, an electromagnetic switch, or a radio frequency resonant switch, among other mechanism types. For example, with respect to a breakaway tab switch or a pull-tab switch, activation can be accomplished by a user physically activating the circuit. In some embodiments, a transmitting device can be used to remotely accomplish the activation.

A communications mechanism can be incorporated into the circuit, such as, for example, a set of target contact points 9, suitable for contacting with an external probe device can be utilized and can be located within the device or can be positioned for contact without penetration into the device. As discussed above, a wireless interface 10, such as infrared or radio frequency modulation circuit can be utilized in some embodiments. Some purposes of the hardware described above, for example, can be to provide mechanisms for sensing environmental variables, performing storage of measured data, performing processing of the measured data (e.g., under embedded software control), providing display indications, and/or providing download and/or offload capability of processed data.

In some embodiments, a flexible or rigid printed circuit assembly can serve as a substrate or mounting surface for the electronics. For example, the electronic components can be provided as surface mounted components. Some embodiments, such as that illustrated in FIG. 1A, incorporate power source 8 (e.g., a tab-mounted coin-cell type power source) into the circuit assembly.

Also present in the embodiment of FIG. 1A, are a number of indicating Light Emitting Diodes (LEDs) as indicators 4. Such indicators can, for example, be arranged to indicate an upper yellow, a middle green, and a lower yellow light as indicators 4. As discussed herein, other display indicators can be used in various embodiments.

Figure 1B:
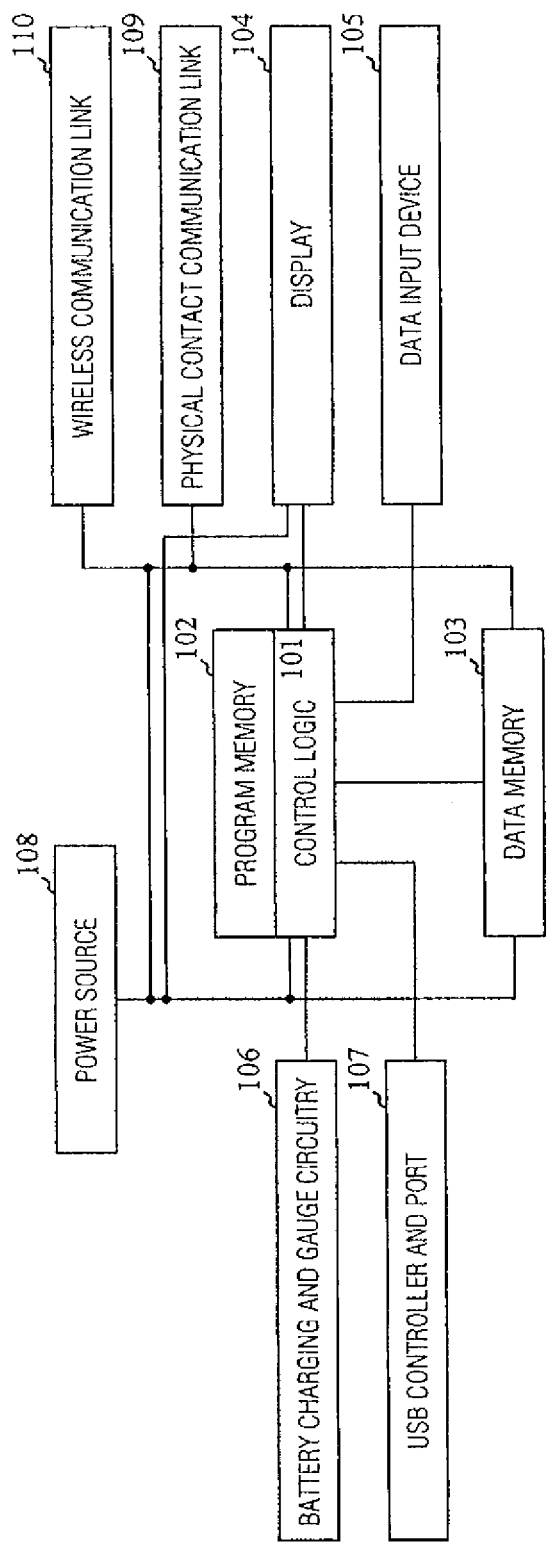
FIG. 1B is a schematic block diagram of a circuit of an embodiment of the present disclosure.

In some embodiments, for example, as shown in the embodiment of FIG. 1B, a circuit of the remote reader device may include a logic circuit, such as a microcontroller, processor, and/or other logic circuitry (e.g., state machine, hard wired logic, etc.) 101, a program memory 102 (e.g., read-only, read-writable), a data memory 103, a display (e.g., an LCD, electro-luminescent, vacuum fluorescent, or other display) 104, a data input device (e.g., a membrane keypad, a touchscreen, a keyswitch assembly, etc.) 105, and/or a power source (e.g., primary cell, rechargeable battery, inductive/magneto charging current source, etc.) 108. Although program memory 102 and data memory 103 are illustrated as separate components, in one or more embodiments, a single memory can store both data and program information. Program and/or data memory can include, for example, a non-volatile memory such as Flash, a hard-disk drive, and/or a low-power static RAM.

A communication link (e.g., wireless communication link 110 and/or physical contact communication link 109) can be incorporated into the circuit. A wireless communication link 110, such as infrared or radio frequency modulation circuit, optical communication, and/or an electromagnetic couple can be utilized in various embodiments. For example, a wireless communication link 110 can include a radio frequency transceiver, which can include a circuit board trace antenna. A physical contact communication link 109 can include a set of target contact points suitable for contacting with an environmental sensing assembly from which environmental data and associated time data are received. A physical contact communication link 109 can also be used to provide power to an environmental sensing assembly, for example, when a power supply for the environmental sensing assembly has been exhausted, or is otherwise nonfunctional.

Also present in the embodiment of FIG. 1B, is a display 104 such as an LCD display. Such a display 104 can, for example, include a touchscreen as a data input device 105 on the display 104. As discussed herein, in various embodiments, data processed by the logic circuit 101 can be output to the display 104. As used herein data processing, processed data, etc. neither mandates nor excludes the presence of a processor in a particular device.

The embodiment illustrated in FIG. 1B includes a universal serial bus (USB) controller 107 coupled to a USB port 107. Such an embodiment, for example, can facilitate transfer of data stored in the memory 103 to a computing device. The remote reader device can include battery charging and gauge circuitry 107 to charge the power source 108 (e.g., battery) and provide an indication of charge status on the display 104.

Some purposes of the hardware described above, for example, can be to provide mechanisms for performing storage of measured data, performing processing of the measured data (e.g., under embedded software control), providing display indications, and/or providing download and/or offload capability of processed data.

The logic circuit can be configured to receive environmental data and associated time data via a communication link (e.g., wireless communication link 110 and/or physical contact communication link 109). For example, one or more environmental sensing assemblies can measure environmental data and time data and transmit the data to the remote reader device. As described herein, the electronics assemblies can timestamp measured environmental data prior to communicating such data to a remote reader device.

The logic circuit 101 can be configured to aggregate time data associated with environmental data into categories including: Within, Above, and Below (WAB) a range of environmental data. For example, program memory 102 of the remote reader device, or one or more environmental sensing assemblies can include a range of environmental data, such as a range of temperatures. The logic circuit 101 can categorize received environmental data according to whether it is within the range, above the range, or below the range.

The logic circuit 101 of the remote reader device can aggregate data received from one or more environmental sensing assemblies. For example, environmental sensing assemblies may sense and record an environmental data point at particular intervals (e.g., once per minute). The logic circuit 101 can aggregate the data points over the duration of the entire sample (e.g., 10 hours) and categorize the data with respect to a specified range of environmental data.

The logic circuit 101 can be configured to output the aggregated and/or categorized time data to the display 104. The aggregated and/or categorized data can be output as percentages of a total time over which environmental data is measured by one or more environmental sensing assemblies. Likewise, the aggregated and/or categorized data can be output as times, for example, in hours and minutes.

For example, consider a shipment of goods that had a particular environmental aspect measured for the duration of shipment (e.g., temperature over 10 hours). A range of temperatures could be specified as 40 to 70 degrees F. After receiving environmental data from one or more electronic assemblies associated with the shipment, the logic circuit 101 of the remote reader device could determine that the temperature of the shipment was within the range for 8 hours and 27 minutes, above the range for 1 hour and 3 minutes, and below the range for 30 minutes. Accordingly, the logic circuit 101 could output data to the display as "WAB=8:27/1:03/0:30". Likewise, the logic circuit 101 could output data to the display as "WAB=84.5%/10.5%/5.0%". As the reader will appreciate, other display formats are possible with one or more embodiments of the present disclosure.

Displaying such information to a user can be beneficial in allowing the user to ascertain how much time items in a particular shipment have spent outside of an environmental range. For example, an organization may have a receiving dock for receiving deliveries. A shipping technician working on the dock may use a remote reader device to download environmental data from one or more electronics assemblies associated with the delivery (e.g., located on a truck). The shipping technician can observe the WAB data on the display to quickly determine whether the shipment should be accepted or rejected based on a perceived status of the goods.

That is, for varying shipments of goods, the organization responsible for creating and/or shipping, some standards setting group (e.g., the FDA), or another entity, may establish parameters within which a particular shipment of goods is considered acceptable. For example, such parameters can relate to a maximum percentage of time or a maximum duration of time that a particular shipment of goods can be exposed to environmental conditions outside of a particular range. In some instances (e.g., temperature), deviations from the range may be more severe in one direction than another. For example, for perishable goods, warmer temperatures may be more harmful than cooler temperatures. For other goods, the opposite may be true.

Displaying WAB data to a shipping technician can allow the individual to make an estimate of the quality of goods that the technician is receiving. A more detailed analysis of the shipping conditions, derived from environmental data measured and recorded by one or more electronics assemblies associated with the shipment and transferred to the remote reader device, can be performed (e.g., with the assistance of a computing device) after transferring the environmental data from the remote reader device (e.g., via the USB port). However, for the purposes of making an initial decision on whether to accept a shipment, WAB data can provide a valuable snapshot of the quality of a shipment.

In some embodiments, a label graphic can be constructed (e.g., from plastic and/or paper film, etc.), as is shown in the embodiment of FIG. 2. A cover, for example including the label graphic, can be used to cover the circuit assembly. In such embodiments, the cover can include printed features on its surface.

In some embodiments, a cover can also be made larger such that it can be folded to cover both the front and the back of the Printed Circuit Assembly (PCA). In various embodiments, an area of the cover can be printed with legend information (e.g., text and/or symbols) that identifies what the one or more indicators signify. The label can be fabricated from any suitable material including translucent or opaque materials and can be provided as a clear material with overprinting thereon, in some embodiments.

In some embodiments, the label graphic and the printed circuit assembly can be integrated such that a portion of, or the entire, printed circuit is part of, or attached to, the label material. In some such embodiments, the label may be designed such that the graphic, or portions thereof, may be applied before the printed circuit is created. In some embodiments, the label may be designed such that the graphic, or portions thereof, may be applied after the printed circuit is created.

In embodiments that utilize one or more illuminating indicators, such as LEDs, the indicators can illuminate printed lenses 11, for example, from behind. The legend information associated with the indicators (e.g., adjacent to the lenses 11 in FIG. 2), can be modified to suit the measurement and/or alert parameters that are programmed.

Various embodiments can use plastic films that accept inks that can be printed by ink-jet, laser, flexographic, and/or other suitable printing processes. Some embodiments may be capable of utilizing the high-resolution and/or deep color saturations possible using off-the-shelf printers, such as those available from Hewlett Packard, Canon, or Primera.

Embodiments can also include other graphic elements such as a logo, target product identification area 12, an activation break point graphic 13, and/or a temperature limit graphic 14, as illustrated in the embodiment of FIG. 2. Rather than a break point graphic 13, graphics can be provided for other types of switches such as those switch types identified above, among others. The logo and target product identification area 12, as well as the temperature limit graphic 14 can be used, for example, to provide a package, tag, or label to be supplied with a unique graphic that is matched to the parameters that are programmed into a controller's program memory 2 and/or data memory 3.

For instance, features 12 and 13 can provide identification of the target product and its parameters. The activation breakpoint graphic 13, the embodiment of FIG. 2, is placed over an area of the printed circuit assembly that has a breakaway corner, to indicate to the user where the circuit can be activated when it is time for monitoring to commence. In some embodiments, such as in some flex circuit embodiments, this activation mechanism can be a tear off, snap corner, or momentary switch as such activation mechanisms are understood in the art.

In some embodiments, a circuit assembly (e.g., printed circuit with a cover label 15), as depicted in FIG. 3, can be inserted into a pouch 16. The pouch can be of any suitable material and can be sealed permanently or resealably in any suitable manner. For instance the pouch can be heat-sealed, glued, or have a physical sealing structure formed from the pouch material.

As stated above, in some embodiments, the pouch can be fabricated of a material that meets one or more requirements within a particular field. For example, in the field of food transportation, the material may be a material deemed safe to be placed near or in contact with food.

Examples, of such materials include, but are not limited to materials including plastics, vinyls, polystyrenes, and other such materials. For instance, polyethylene terephthalate (PET) is one suitable plastic material for use with food. In some embodiments, the exterior of the pouch can meet such a requirement, while the interior may or may not meet a requirement.

Figure 4:
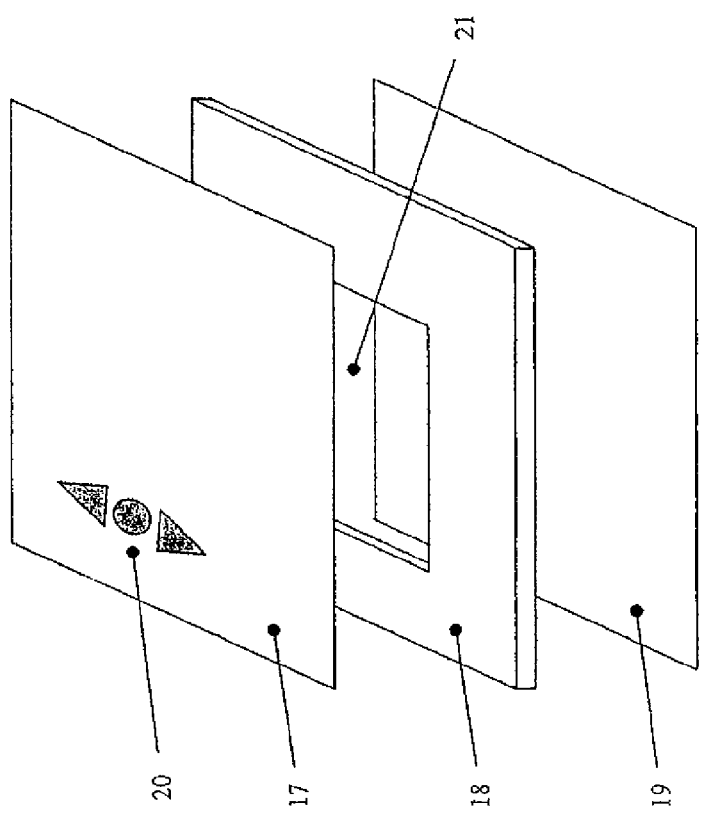
FIG. 4 is a partially exploded view of a monitoring device of an embodiment of the present disclosure.

In various embodiments, such as that depicted in FIG. 4, a circuit assembly can be inserted into a hole 21 (e.g., die-cut) into a piece of material, such as in a piece of foam (e.g., closed-cell) or plastic 18, which can then be laminated on its top and/or bottom surfaces (e.g., with printed plastic film covers, 17 and 19). In some embodiments, the film can be heat sealed to the foam or can be adhered with adhesive to the foam. Embodiments having such a laminated assembly can include graphic information and/or lenses 20 as part of a top film cover 17, which, for example, may comprise translucent or clear material with overprinting, or can have lenses.

In various embodiments, the tag or label device may also be inserted into a packaging material. In such embodiments, the tag or label may be built into or added to a larger label or a larger pouch that can be adhered to a package or inserted into a package.

Figure 5:
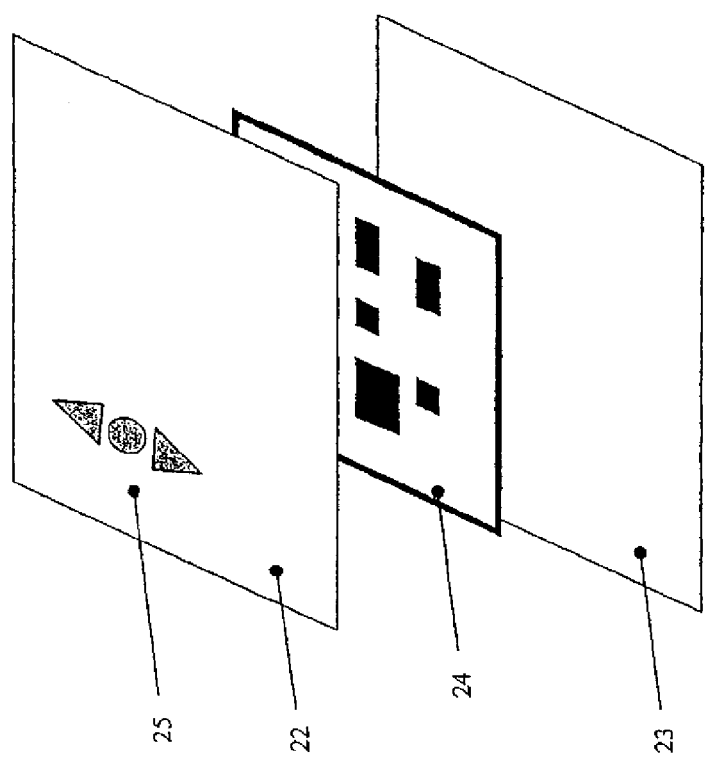
FIG. 5 is a partially exploded view of a monitoring device of an embodiment of the present disclosure.

FIG. 5 depicts an embodiment of a tag or label that comprises a top cover 22 and a bottom cover 23 that cover the top and bottom of printed circuit assembly 24. Such an embodiment can also have graphic information and lenses as part of the top film cover 22, which may, in some embodiments, comprise translucent or clear material with overprinting, and/or can have openings with lenses built in as separate materials.

Figure 6:
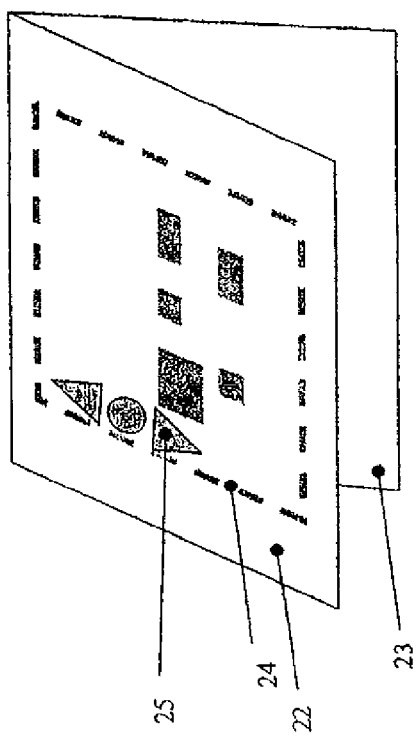
FIG. 6 is a cover detail of a monitoring device of an embodiment of the present disclosure.

FIG. 6 depicts an embodiment, having a top label graphic cover 22 and a bottom cover 23 that are the same piece of material (e.g., folded or cut in half or other dimensions/shapes). The printed circuit assembly 24 is illustrated mounted underneath the top half of the cover, and aligned with lenses 25.

If an adhesive is used to bond the covers 22 and 23 to printed circuit assembly 24 and/or to each other, then the assembly can be utilized as a covered electronic assembly with label surfaces on both sides, and with lenses for the light transmission of the indicators. In various embodiments, the assemblies of FIG. 5 and/or 6 can be inserted into the pouch as discussed with respect to FIG. 3.

Various label, tag, or package-based device embodiments can be provided that process and/or store data. Embodiments can facilitate communication of the data to reader devices. In such embodiments, reader devices can communicate by way of any suitable direct connection (e.g., via the use of probe pins) or any suitable wireless connection type. Suitable types of wireless connections include infrared, LEDs (e.g., in data transmission mode, can emit pulsed visible light), and/or radio frequency modulation among many other connection types known to those in the art.

With respect to embodiments utilizing a radio frequency communication connection, radio frequency based readers utilize a one-way (transmit only) or a two-way radio mechanism to be associated with the tag, label, or reader device. Likewise, a one-way (receive only) or two-way radio connection can be used by the reader device to match the tag, label, or package device with which it will be communicating.

These data radio mechanisms can be based upon established standards, such as IEEE 802.11b, or based upon other proprietary radio technologies. The radio mechanisms associated with the tag, label or package devices may also participate in a networked (e.g., mesh network) or similar interface scheme to communicate with the reader. These types of networks may fall within IEEE 802.15.4 standards development, among others.

As readers gather the data from their respective tags, labels, or packages, the readers, in turn, can communicate the data or files to databases or other storage locations. In some embodiments, this can be accomplished via another type of data device. For example, such devices can include a standalone gateway, hub, router, or other type of computing device, such as a personal computer, portable computing device, or server type computing device.

These devices can communicate with tag, label, or package readers by way of wired or wireless interfaces, including Internet or other connection types. Through these connections, data can be forwarded to one or more databases for storage and/or analysis, among other functions. If a gateway or hub device communicates wirelessly to a database, then it can be autonomous with respect to its immediate environment.

In such embodiments, a gateway or hub device can be situated, for example, in a warehouse, on a pier, or in an industrial area and perform its function without utilizing additional local information technology infrastructure. This can represent added value, for example, for users who do not wish to upgrade their existing computer and IT equipment.

Figure 7:
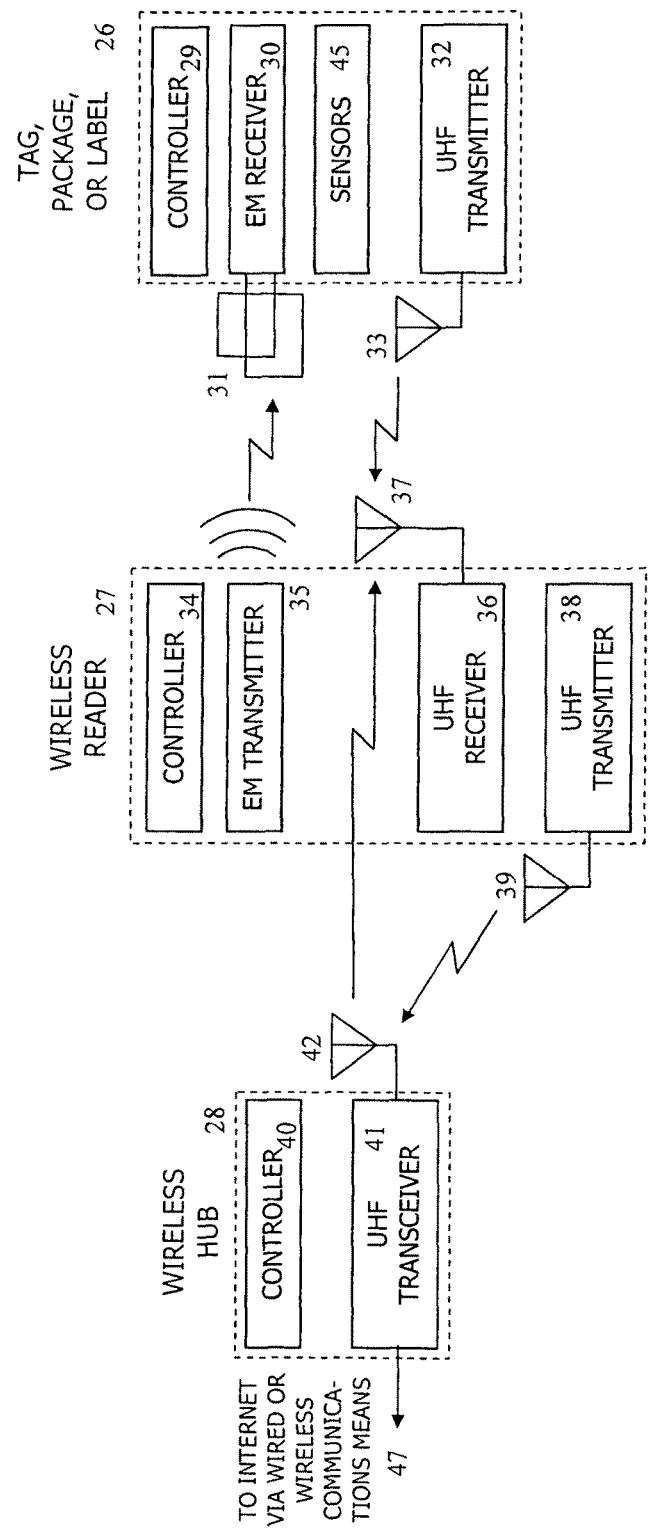
FIG. 7 is a schematic block diagram showing connectivity of elements of a system embodiment of the present disclosure.

FIG. 7 is a schematic block diagram showing a remote reader device (e.g., wireless reader 27) and a wireless hub 28 in communication with a tag, package, or label device 26. As depicted, each device has its own logic circuitry, 29, 34, and 40, respectively. In such embodiments, these logic circuits can utilize a microcontroller or microprocessor device in communication with program memory and data memory, a state machine functionality, logic circuitry utilizing a number of flip flops, or other such logic components. Such controllers can control the operation of the other devices in each respective circuit.

The embodiment of FIG. 7 includes a number of different communication links in various formats. Communication links can be in any suitable format. For example, in the embodiment of FIG. 7, an electromagnetic (EM) communication transmitter 35 is employed in reader device 27 to form a communication link to send a pulse or series of pulses to EM receiver 30 via an antenna (e.g., a coil type antenna) 31 thereby utilizing an EM channel. The transmitting or receiving functionality of a communication link can be provided by one or more transmitters, receivers, and/or transceivers. Although designated as EM and RF transmitters and receivers in the embodiment of FIG. 7, it is to be understood that any suitable wireless or wired communication mechanisms can be utilized in various embodiments of the present disclosure.

An EM channel typically operates at close range and can be used to initiate an upload of data, for example, telling the tag, package, or label device 26 to wake-up and begin transmitting data via a transmitter 32 and antenna 33 over to wireless reader's 27 receiver 36 via its antenna 37. In such embodiments, the wireless reader can receive and process the data using its controller. Devices can also be designed to transmit processed data to wireless hub 28 via transmitter 38, via antenna 39 to hub 28 to transceiver 41 via antenna 42. Hub 28 can also be utilized to transmit signals containing commands and data to reader receiver 36 via its antenna 37, in some embodiments.

In various embodiments, a wireless reader can transmit data from a label directly via a communication link over a wired or wireless network 47 to a remote location (e.g., to a remote device such as a hub or computing device) or directly to a computing device 76 for storage and/or analysis. Such communications can, for example, be accomplished via a data modem 74 and a communication link (e.g., a communication interface) 75. A wireless reader can be beneficial in some fields of use since the products being shipped may not be near a fixed power source and/or fixed computing device.

The wireless reader can transfer data via a RF modem and a network such as by global system for mobile (GSM) communication. The wireless reader may also transfer data over a wired connection, such as via universal serial bus (USB), to a hub or other network device (e.g., a computing device) for storage and/or analysis. Such hubs and computing devices may also transfer the data via wired or wireless communications to a remote location for storage and/or analysis.

Figure 8:
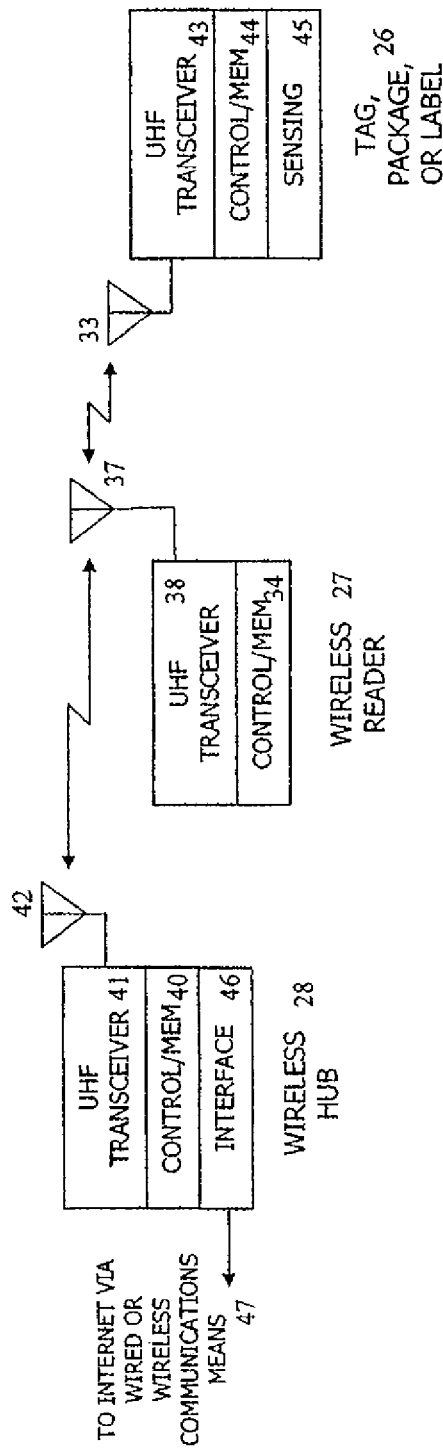
FIG. 8 is a schematic block diagram showing connectivity of elements of a system embodiment of the present disclosure.

The schematic block diagram shown in FIG. 8 illustrates another embodiment with a similar communication technique to the one described for FIG. 7. In this embodiment, all of the communications for the tag, package, or label device 26, remote reader device (e.g., wireless reader device 27) and wireless hub device 28 are implemented using transceivers 38, 41, and 43, which are present in each respective device, along with antennae 33, 37, and 42.

The transceivers allow the same or similar communication capabilities as for the system depicted in FIG. 7. Transceivers can have various standard protocols, including 13 MHz or UHF forms of Radio-Frequency Identification (RFID) transceivers, IEEE 802.11, IEEE 802.15.4 type devices, and non-standard and proprietary protocol devices, among others.

As is the case for the embodiment depicted in FIG. 7, each device shown in FIG. 8 has its own logic circuitry, 34, 40, and 44. Again, these controller circuits can utilize a microcontroller or microprocessor device, among other logic types, in communication with program memory and data memory. Each tag, package, or label device 26 also includes sensing circuitry 45.

The wireless hub communicates to databases by wired or wirelessly through interface 46 via the Internet 47 or other media conduit. Similar to the embodiment of FIG. 7, the wireless reader 27 of FIG. 8 may also transfer data to a remote location by wired or wireless communications. This may be accomplished, for example, via a communication interface 96. Such embodiments may utilize the Internet or mobile communications networks for transferring data.

Figure 9:
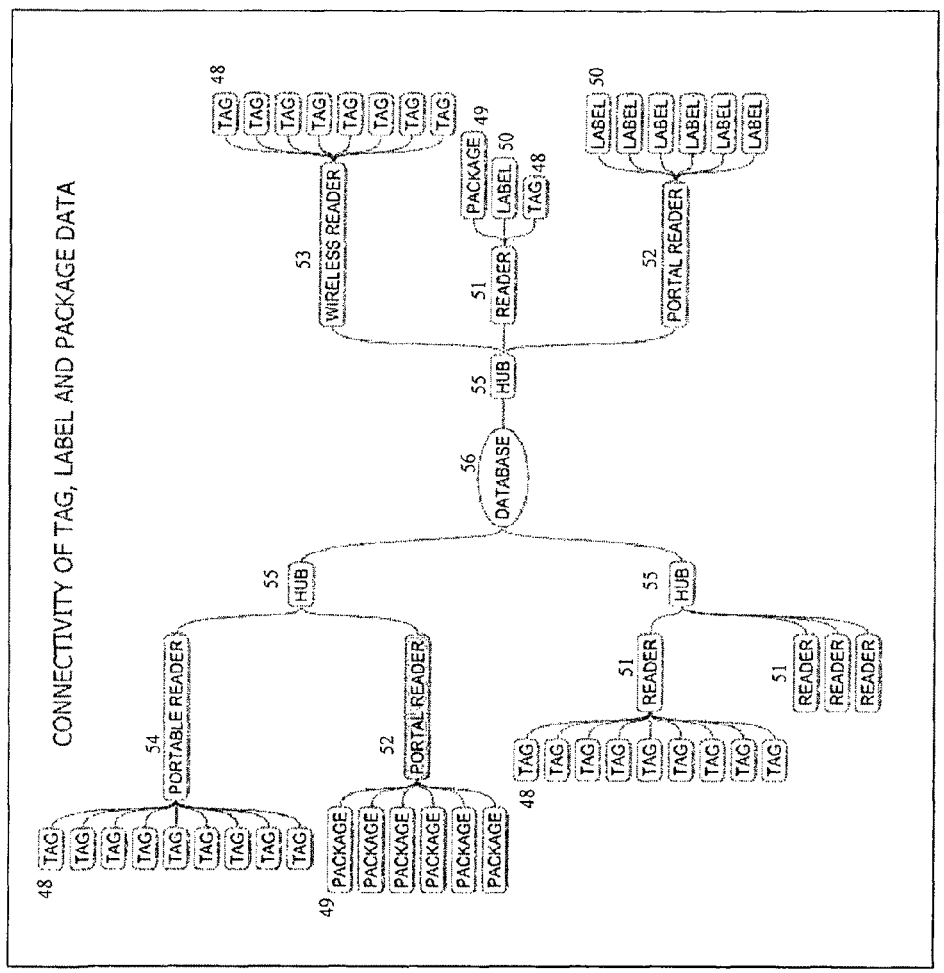
FIG. 9 is a flowchart of the connectivity schema of tags, packages, and labels in a monitoring system embodiment of the present disclosure.

FIG. 9 is a connectivity diagram, depicting an example of how tags 48, packages 49, and labels 50 can all be connected in locations distant from one another using different types of remote reader devices (e.g., readers 51) into a database 56. Readers can be fixed (e.g., mounted on portals to buildings 52) or portable 54.

Readers can communicate in a wired and/or wireless manner 53. In various embodiments, each reader can be in communication with a hub 55 that is in its locality, among other locations. Each hub can be configured to connect to a database 56 or multiple databases.

In some embodiments, a reader can also provide the functionality of a hub or be a hub network device. In such embodiments, the system may not utilize independent hub devices, but rather, one or more of the readers can provide such functionality to the systems. In some embodiments, hubs and readers can be used to provide such functionality. In the tag, label, or package device of the present disclosure, executable instructions can be loaded and executed by a controller or other control logic of the device.

The executable instructions (e.g., loaded or embedded software/firmware) can implement a variety of methods of data compression. In various embodiments, the sensor readings can be compared to past readings and decisions can be made, based, for example, upon programmed, settable parameters and/or upon the value of the new data. For instance, if a new reading is within a range of environmental data (e.g., one or more settable window limits) as compared to the last reading, then the new reading is not stored, and if outside of the limits, then the reading is stored.

In some embodiments, data compression can be provided by storing the difference between two values (e.g., adjacent values in time, adjacent values as stored, difference from a reference value, etc.)

Another storage condition can be used, such that if a settable period of time has passed since the last storage of a reading, then a new reading will also be stored. Such criteria (e.g., limits and periods of time) can be designed to be pre-programmed and/or programmable in the field, in various embodiments.

In some embodiments, in order for circuit assemblies for tags, labels, and packages, as described above, to be manufactured in volume, it may be advantageous that they be loaded, during manufacture, with tuning parameters that allow application specific, and/or custom tuned, functionality to suit different user's monitoring desires. An example method that can be employed to accomplish tuning at the end of the manufacturing process is called late-stage customization.

This method involves building the printed circuit assemblies (PCA's) to be generic. With such embodiments, it may be possible for PCAs to be inventoried as generic units until an order is placed for some quantity of tag, package, label, or reader products and is to be filled.

The order may contain information that can be used to customize the generic assemblies. For example, at the point where an order is to be filled, the generic board can then receive its executable instructions and data. Once such programming is accomplished, a power source (e.g., power source 8 in FIG. 1) can be connected to the circuit. In some embodiments, the generic assembly may have the power source attached prior to programming of main or customized executable instructions. In some such embodiments, the device can be designed such that the program can provide a power-on self-test procedure and then go to sleep, waiting for activation by a user to occur.

In some embodiments, the executable instructions, upon powering up, after the power source (e.g., a battery) is installed, can set up a number of variables, read setpoint and alert data from the EEPROM, and then put the controller into a sleep mode. In sleep mode, the controller can, for example, still be powered but not execute instructions, and therefore draw very low power levels, in order to preserve the life of power source, among other benefits.

Some embodiments can employ and make use of specific parameters, previously stored in the EEPROM array contained within the tag or label circuit, for example, to establish the personality of a tag, label, or package, among other uses. The executable instructions, for instance, read these personality parameters upon activation, allowing for executable instructions to then behave according to loaded parameters.

The parameters can be data that allow configuration setpoints of, for example, limits for ranges of environmental data (e.g., temperature), over-temperature, under-temperature, or time-temperature integration thresholds. Other parameters can include environmental sensing assembly identifier numbers (e.g., serial numbers), model numbers, times, locations, and/or data sample rates, among others. Although serial numbers are used herein as one example of an assembly identifier, an assembly identifier need not be the same as a particular device's serial number. This information can allow for indication and alert modes to be stored, retrieved, and utilized to set specific desired operations, among other functions.

Various embodiments include the incorporation of printed information onto the front and/or back surfaces of the package, tag, or label, which can, for example, be printed during manufacturing. Executable instructions, including, for example, specific compiled or assembled program code and/or parametric or personality data, as described above, can be written (e.g., via a programming fixture) to the program and/or one or more data memory components of a generic PCA that is to be finalized into a tag, label, or package.

Figure 10:
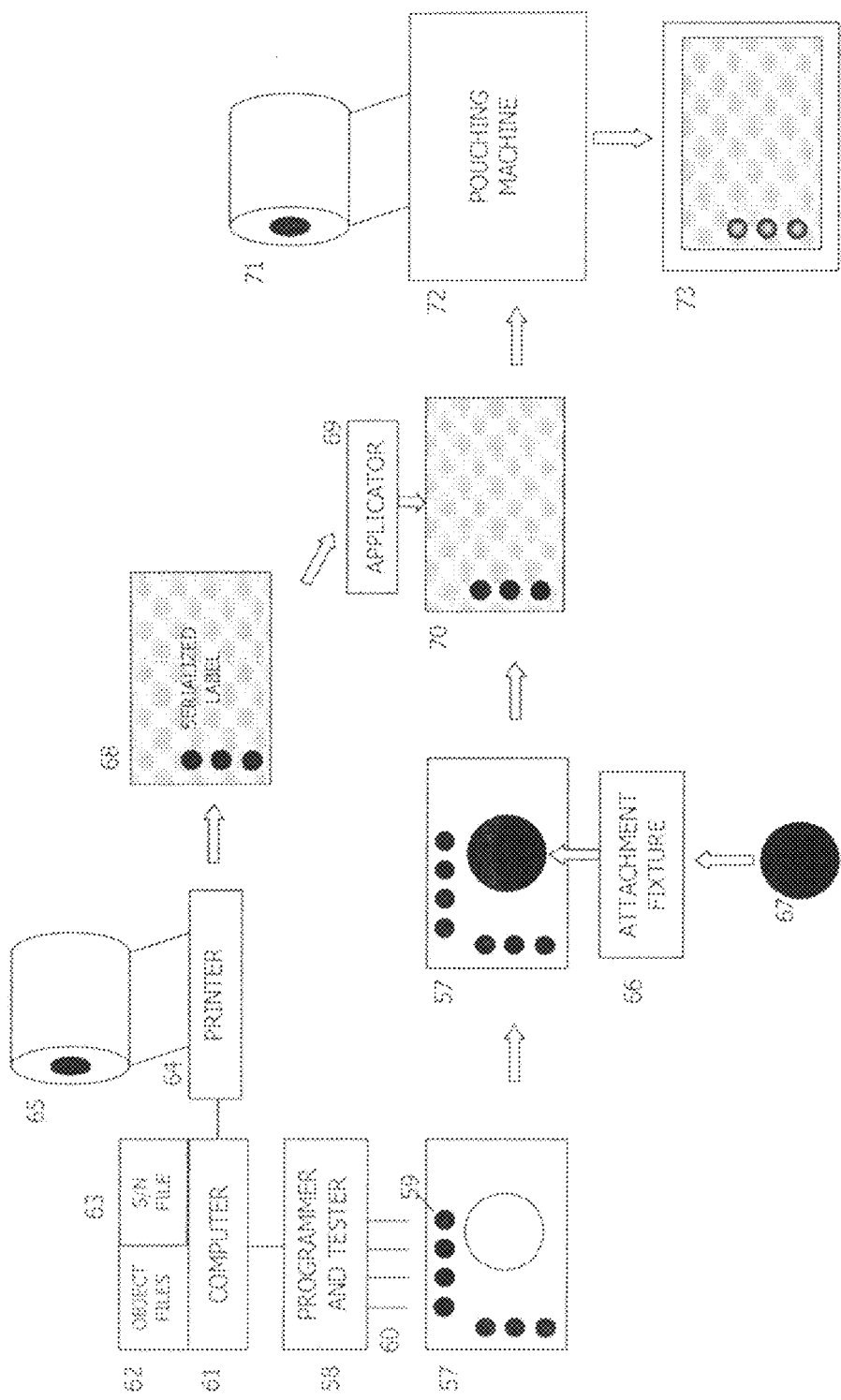
FIG. 10 is a process flow diagram for a portion of a manufacturing process embodiment of the present disclosure.

In the process flow diagram depicted in FIG. 10, a previously manufactured PCA 57 is brought in contact with a fixture 58 where electrical contact is made to one or more test pads 59 via one or more test probes 60. The program and test fixture 58, through such contact between pads 59 and probes 60, programs one or more of the memories and tests the function of the assembly. The programming and test function can be accomplished through use of an off-the-shelf computing device (e.g., personal computer (PC) 61).

Computer 61 can contain specific object files 62, and/or device information such as a record of serial numbers, which can be managed and/or kept in a database file 63. Serial numbers and, in some embodiments, real-time date and time stamp, can be loaded into data memory. The serial numbers can be incremented with each successive PCA that moves through the process, in some embodiments.

As each PCA 57 is programmed and tested, the serial number information can be printed onto a label by printer 64, along with other desired text, bar coding, and/or other graphical information that is to be displayed on the surface of the tag, label, or package. As used herein graphical material can include symbols, including numbers and letters, graphs, and other graphical representations of results and/or information. The printing and testing can be accomplished simultaneously in some embodiments. In various embodiments, a printer 64 can be fed with printable material 65 (e.g., roll or sheet form label stock), and the printer 64 can emit a serialized label 68 upon control of computer 61 each time a PCA is programmed and tested. Note that label 68 can contain lenses for indicators or display elements to show through. The lenses can be previously fabricated onto the label stock material 65, and/or the label stock can be clear or translucent. The lenses can become a printed feature, with many ink, patterning, and material choices available to create lenses, viewing windows, etc.

In the embodiment of FIG. 9, once a PCA 57 is completed and/or has passed testing, it can proceed to attachment fixture 66. Power source 67 can be associated with the electrical circuit of the PCA 57 and powered-up if desired. In some embodiments, the power source can be affixed and associated with the PCA prior to programming of the PCA.

PCA 57 can receive the printed label 68 via applicator 69 while in a powered-up condition. Note that a combination of the aforementioned program, test, installation of power source, and application of label, among other functions can be accomplished in a single process location, and can be automated using pneumatic controls, actuators, and/or machined fixturing.

In some embodiments, a completed, labeled PCA 70 can be inserted into a pouch (e.g., formed from roll-stock clear web material 71). Pouches can be constructed from any suitable material. For example, packaging materials, such as Snack-Web or other Rapid-Roll products from Avery Dennison, can be used.

In the embodiment of FIG. 10, the two components, 70 and 71 are fed into a pouching machine 72, or other suitable pouching device or process. Such pouching techniques can be used to enclose a labeled PCA 70 into a pouch 72 and thereby provide a pouched, activatible, safe for contact with food, and/or water-resistant product 73 that can be inserted into other packaging, labeling, or over-packaging. In some embodiments, the assembly can be made more flexible by utilizing a flexible PCA 57.

Post-printing of a label graphic, at a late-stage in manufacturing, can provide a benefit in that the product can be built to order using a set of components that can be used with respect to each product's bill of material. In some embodiments of a post-printed product, it is also possible to print directly on the web material 71 used for pouching, on the inside and/or the outside surface of the material.

Rather than printing a separate label material 65 that is internal to the pouch or, alternately, affixed to the outside, direct printing on the web material 71 results in fewer steps and a simpler product, among other benefits. Post-printing can be accomplished on any suitable rolled web material, such as materials that are clear, translucent, opaque, and/or materials having multiple areas of different opacity.

Materials can have one or more lens features and/or window features. For example, an opaque foil laminate or plastic laminate material can be used and can be fabricated having one or more lenses and/or windows.

In the following process method embodiment, addressing the flow diagram depicted in FIG. 11, a manufactured PCA 77 can be brought in contact with a fixture 78 where electrical contact can be made to test one or more pads 79 via one or more test probes 80. The program and test fixture 78, through such contact between pads 79 and probes 80, can be used to program the one or more memories and test the function of the assembly.

Figure 11:
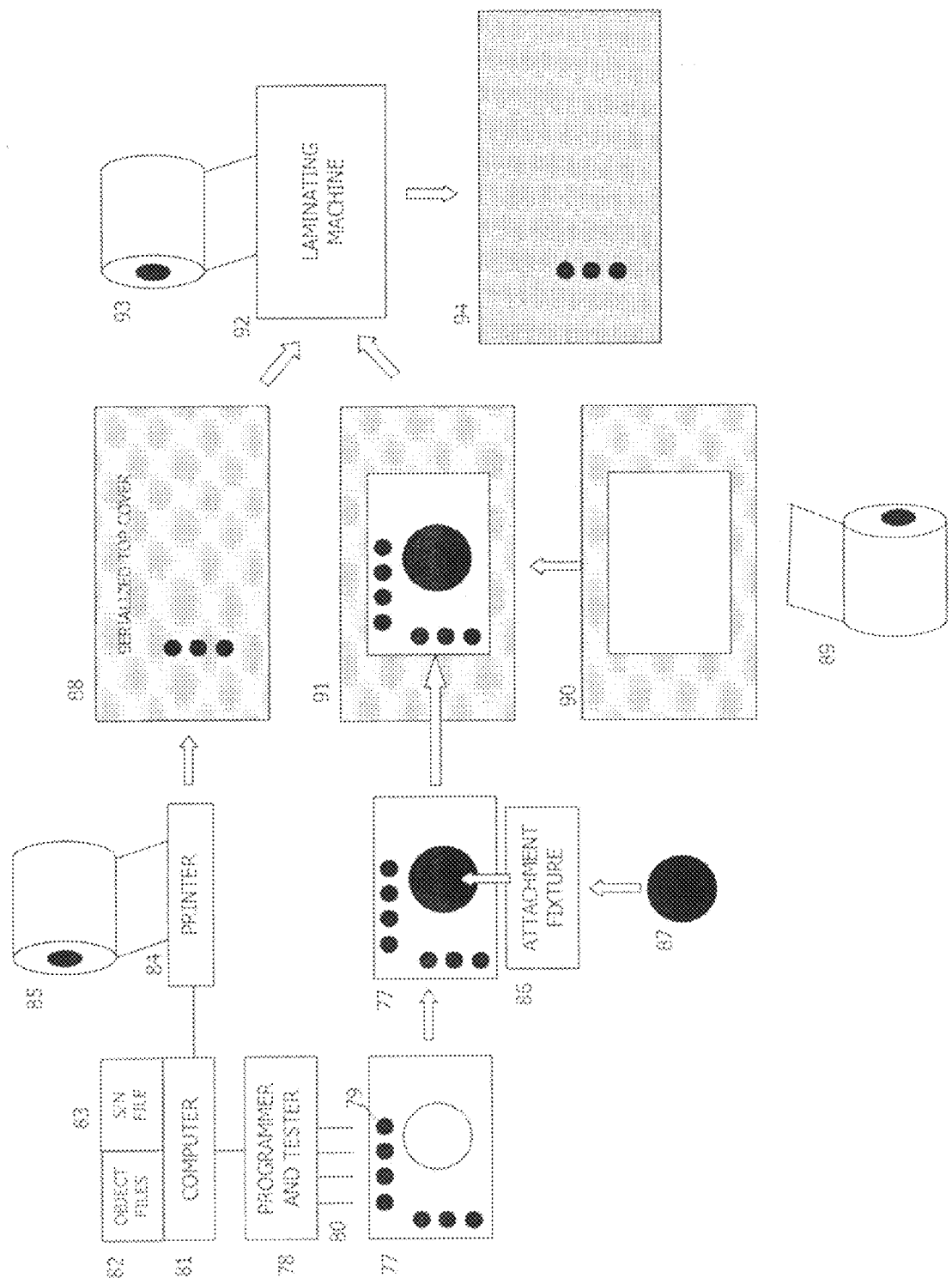
FIG. 11 is a process flow diagram for a portion of manufacturing process embodiment of the present disclosure.

In various embodiments including those illustrated in FIGS. 10 and 11, a PCA with a pre-programmed processor can be used. In some such embodiments, such programming can allow for certain instructions and or personality information to be transferred and/or programmed into the PCA using wireless and/or non-contact communications, among others.

The programming and test functions can be accomplished, for example, through use of an off-the-shelf computing device (e.g., personal computer (PC) 81). Computer 81 can contain specific object files 82, and one or more records of serial numbers, which are managed and kept in a number of assembly identifier (e.g., serial number) database files 83. Serial numbers and a real-time date and time stamp can be loaded into data memory and such device can include executable instructions to increment the serial number to be used with each successive PCA 77 that moves through the process.

As each PCA 77 is programmed and tested, a simultaneous event occurs, in which the serial number information is printed onto a label by printer 84, along with other desired text, bar coding, and/or other graphical information that is to be displayed on the surface of the final product. Printer 84 is fed with roll form top cover material 85, and the printer 84 emits a top cover 88 upon control of computer 81 each time a PCA 77 is programmed and tested.

In some embodiments, it should be noted that top cover 88 can contain lenses and/or windows for indicators or display elements to show through. The lenses can be previously fabricated onto the label stock material 85, or the label stock can be clear or translucent, and the lenses become a printed feature, with many ink, patterning and material choices available to create workable lenses.

Once a PCA 77 is completed and has passed testing, it proceeds to attachment fixture 86, where power source 87 is attached to the electrical circuit of the PCA 77. Once the circuit is powered-up, PCA 77 can be inserted into a punched hole in spacer 90, and they together form positioning structure 91. In some embodiments, the power source can be attached prior to final programming and/or testing of the PCA.

The spacer material can be any suitable type of material. For example, the spacer can be a type of foam, elastomer, plastic, cotton based, or wood based material, among others. The spacer material can be of any suitable thickness, and may, for example, be the same height as the PCA. Such an arrangement provides protection and accessibility to the PCA, among other benefits. It can be provided as die-cut parts loaded onto reels. Note that a combination of the steps described can be automated using pneumatic controls and actuators and machined fixturing.

In various embodiments, the positioning structure 91 can be inserted, along with top cover 88 and bottom cover 93 into a laminating machine 92. For example, the bottom cover material can be fed from rolls or in sheets into the laminating machine 92.

In some embodiments, the resultant tag, label, or package device 94 has two film-like covers over a positioning structure of a consistent height. The positioning structure 91 can be made more flexible by making PCA 77 a flexible PCA. The resultant device 94 is water resistant and can be inserted into other packaging, labeling, or over-packaging, as desired.

In some embodiments, the environmental sensing assembly can include an inner portion including the environmental sensor, memory, logic circuit, indicator component, and the power source, among other assembly components. An outer portion can include an encapsulating material that encapsulates the inner portion. In such embodiments, the outer portion can be formed from any suitable material, such as plastic, vinyl, paper, and/or polystyrene materials, among others.

In some embodiments, the outer portion can be formed from a number of pieces (e.g., a top cover and bottom cover) that can be adjoined to encapsulate the inner portion. In some such embodiments, an outer layer (e.g., a pouch) can be placed around the outer layer. The outer layer can be a transparent, opaque, or semi-transparent layer, in various embodiments.

With regard to different methods of attaching this monitoring device onto other items, some approaches include using adhesive backing, use of a mounting tab or a hole for attaching, tying, or hanging on to an item's container, or attaching directly on an item to be monitored. Device embodiments can be built directly into cardboard or plastic packaging, or into totes, bins, or other product containers or assemblies.

The monitoring devices described herein can be built to a specification established by quality assurance personnel. The unused tag, label, or package monitoring device is first installed in its monitoring situation and is activated at the desired time. The device can also be programmed for a delayed activation, such that it begins recording after a programmed delay and/or the occurrence of an event, such as a temperature and/or moisture threshold being met or exceeded.

In some embodiments, the device can be programmed for a delay in monitoring for alerts. In such embodiments, the device can be designed to begin collecting data once activated, but to not act on that data for a set period of time.

Figure 12:
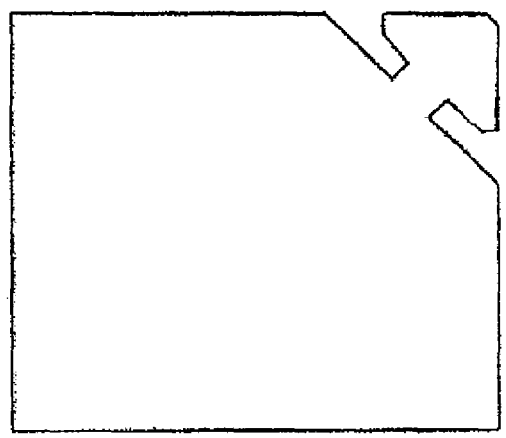
FIG. 12 is an outline of a printed circuit board of an embodiment of the present disclosure.

In some embodiments, as depicted in the representation of the printed circuit board 95 shown in FIG. 12, a corner tab can be pre-cut into the printed circuit board upon fabrication. This tab or a portion thereof can be a thin section that forms a break-off activation switch. In various embodiments, the corner may be scored to facilitate weakening the corner and creating a uniform mechanism for activating the device.

When activation is desired, the user snaps the corner; it opens a circuit trace that runs across the break boundary, which in turn wakes up the processor so that it can begin monitoring. Once activated, the indicators of this embodiment will acknowledge that the device has activated (e.g., flash a number of times).

In operation, the LEDs of the embodiment illustrated in FIG. 1, are constructed to indicate an upper yellow, a middle green, and a lower yellow light on the surface of the device, when shining through the lens areas. In this configuration, the upper yellow indicator can serve as an over limit status indicator, the lower yellow indicator as an under limit status indicator, and the center green indicator can serve as an OK status indicator.

In such embodiments, the LED indicators can, for example, flash once every few seconds, and can also perform double, triple, or coded flashes to signify different status conditions, again as programmed to suit particular applications. An aspect of having indicators that are able to respond to programmatic settings and to indicate derived parameters is that they can provide a summary of events that occur over time. In effect, the one or more indicators can provide a compressed form of data to the viewer.

In various embodiments, the environmental sensing apparatus can be designed to be customized in late stage manufacture or by the customer. For example, in some embodiments, the formation of the environmental sensing component, logic circuit, power source, and encapsulating material can be accomplished to form an environmental sensing assembly, and then one or more customer specific items can be added to the environmental sensing assembly.

Adding a customer specific item to the environmental sensing assembly can, for example, be accomplished by printing a customer specific item on an outer surface of the encapsulating material, by providing an item of data to be used by the logic circuit in determining whether an action should be taken based upon the received sensing information, by configuring the logic circuit with a customer specific configuration to be used in determining whether an action should be taken based upon the received sensing information, and/or other customer specific information, among other items. Such items can include customer specific logos, identifiers (e.g., customer name or other identifier), unit specific identification numbering, threshold information, sampling periods, etc.

In some such embodiments, the addition of these items can be accomplished wirelessly, which may allow the manufacture of the assembly to be completed or substantially completed before the customization is accomplished. Such embodiments can be particularly beneficial where a customer may do the customization since the assemblies can be sent to the customer with just the customization left to be accomplished.

In some embodiments, the encapsulation may not yet have been accomplished when the customization is undertaken. Such embodiments can be beneficial where the assembly is to have printed information thereon that is to be applied just prior to shipping to a customer or to be print by a customer thereon. In some such embodiments, printed items and/or data items can be added, for example.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

Additionally, in reading this disclosure and claims, it should be noted that the indefinite article "a" or "an", as it is used herein, is not intended to limit the number of elements to one. Accordingly, the terms "a" and "an" should be viewed as meaning one or more unless such limitation is expressly stated or such meaning would be illogical based upon the arrangement of elements formed by such meaning. Further, the term "a number of" should be interpreted as meaning one or more.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A non-transitory computer readable medium having computer readable instructions stored thereon for execution by a device to perform a method of environmental data collection, comprising:

receiving to the device environmental data and associated time data from one or more environmental sensors collectively associated with an environmental sensing assembly remote from the device via a universal serial bus (USB) controller that is coupled to a USB port;

providing power from the device to the environmental sensing assembly via the USB controller coupled to the USB port in response to a power source within the environmental sensing assembly being exhausted or otherwise nonfunctional, wherein the power source otherwise powers the environmental sensing assembly without the device;

aggregating time data into categories of environmental data within, above, and below a range; and outputting the aggregated and categorized time data.

2. The medium of claim 1, wherein the method includes outputting the aggregated and categorized time data to a display.

3. The medium of claim 1, wherein the method includes outputting the aggregated and categorized time data as percentages of a total time over which the environmental data is measured by the one or more environmental sensors.

4. The medium of claim 1, wherein the method includes outputting the aggregated and categorized time data as hours and minutes for each of within, above, and below the range.

5. The medium of claim 1, wherein the method includes receiving additional environmental data and associated time data via a wireless communication link.

6. The medium of claim 1, wherein the environmental data includes one selected from the group including: temperature data, humidity data, physical orientation data, proximity data, acceleration data, atmospheric pressure data, chemical data, chemical change data, shock data, vibration data, light data, and combinations thereof.

7. A non-transitory computer readable medium having computer readable instructions stored thereon for execution by a device to perform a method of environmental data collection, comprising:

receiving environmental data and associated time data from a plurality of environmental sensing assemblies, wherein the plurality of environmental sensing assemblies are each associated with a shipment and wherein each of the plurality of environmental sensing assemblies include an assigned environmental sensing assembly identifier;

for each of the plurality of environmental sensing assemblies that are reporting a respective alert event, multiplying an amount by which environmental data is out of a range by the associated time data to determine a product for the respective alert event, wherein the product characterizes a relative magnitude of the respective alert event that begins when the environmental data is out of the range and ends when the environmental data is within the range; and for each of the plurality of environmental sensing assemblies reporting the respective alert event, simultaneously displaying the product, an indication of whether the environmental data out of the range is above or below the range, the associated time data comprising a duration of the respective alert event and a start time for the environmental data out of the range, and a respective environmental sensing assembly identifier to indicate an environmental sensing assembly that is reporting the respective alert; and providing power from the device to one of the plurality of environmental sensing assemblies via a universal serial bus (USB) controller coupled to a USB port in response to a power source within the environmental sensing assembly being exhausted or otherwise nonfunctional, wherein the power source otherwise powers the environmental sensing assembly without the device event.

8. The medium of claim 7, wherein the method includes summing the product for each of a plurality of alert events, each corresponding to environmental data that is out of the range by different amounts during each of the plurality of alert events, and displaying the sum.

9. The medium of claim 7, wherein the environmental data is temperature, and wherein displaying the product includes outputting the product in degree-minutes.

10. The medium of claim 7, wherein the instructions are stored in memory of one selected from the group including: an environmental sensing assembly for environmental sensing; and a remote reader device for the environmental sensing assembly.

11. The medium of claim 10, wherein displaying the product includes displaying the product on a display of the remote reader device.

12. The medium of claim 7, wherein the method includes: displaying the environmental data out of the range.

13. A remote reader device for collecting environmentally sensed data, comprising:

a logic circuit coupled to a power source, a display, and a physical contact communication link, wherein the logic circuit is configured to:

receive environmental data and associated time data via the physical contact communication link from one or more environmental sensing assemblies remote from the remote reader device;

provide power from the remote reader device to a particular one of the one or more environmental sensing assemblies via the physical contact communication link in response to the power source within the particular environmental sensing assembly being exhausted or otherwise nonfunctional, wherein the power source otherwise powers the particular environmental sensing assembly without the remote reader device;

aggregate time data associated with environmental data into categories including: within, above, and below a range; and output the aggregated and categorized time data to the display;

wherein the logic circuit is coupled to:

a universal serial bus (USB) controller that is coupled to a USB port to transfer data stored in a data memory to a computing device; and charging and gauge circuitry to charge the power source and provide an indication of charge status on the display.

14. The device of claim 13, wherein the logic circuit is coupled to a data input device and a data memory.

15. The device of claim 14, wherein:

the data memory is a non-volatile memory;

the power source is a battery;

the device includes a second communication link that is a radio frequency (RF) transceiver; and the device is housed in a molded plastic handheld clamshell.

16. The device of claim 15, wherein the second communication link includes a circuit board trace antenna.

17. The device of claim 15, wherein the data input device is a touchscreen on the display.

18. The device of claim 13, wherein the device is configured to recharge, via physical contact, the particular environmental sensing.

19. A remote reader device for communicating environmentally sensed data, comprising:

a logic circuit coupled to a display and a communication link, wherein the logic circuit is configured to:

receive environmental data and associated time data from a plurality of environmental sensing assemblies via the communication link, wherein the plurality of environmental sensing assemblies are each associated with a shipment and wherein each of the plurality of environmental sensing assemblies include an assigned environmental sensing assembly identifier;

for each of the plurality of environmental sensing assemblies that are reporting a respective alert event, multiply an amount by which the environmental data is out of a range by the associated time data to determine a product for the respective alert event, wherein the product characterizes a relative magnitude of the respective alert event that begins when the environmental data is out of the range and ends when the environmental data is within the range; and for each of the plurality of environmental sensing assemblies reporting the respective alert event, output the product, an indication of whether the environmental data out of the range is above or below the range, associated time data comprising a duration of the respective alert event and a start time for the environmental data out of the range, and a respective environmental sensing assembly identifier to indicate an environmental sensing assembly that is reporting the respective alert event to the display for simultaneous display thereon;

wherein the logic circuit is coupled to:
a universal serial bus (USB) controller that is coupled to a USB port to transfer data stored in a data memory to a computing device; and
charging and gauge circuitry to charge the power source and provide an indication of charge status on the display.

20. The device of claim 19, wherein the logic circuit is configured to output environmental data corresponding to a maximum amount by which environmental data is out of the range during the alert event to the display.

21. The device of claim 19, wherein the logic circuit is configured to output associated time data for a first environmental data point that is out of the range to the display.

* * * * *